March 14, 1961 C. E. BLACKMAN 2,974,797
GRAIN CLASSIFIER
Filed Aug. 30, 1957 2 Sheets-Sheet 1
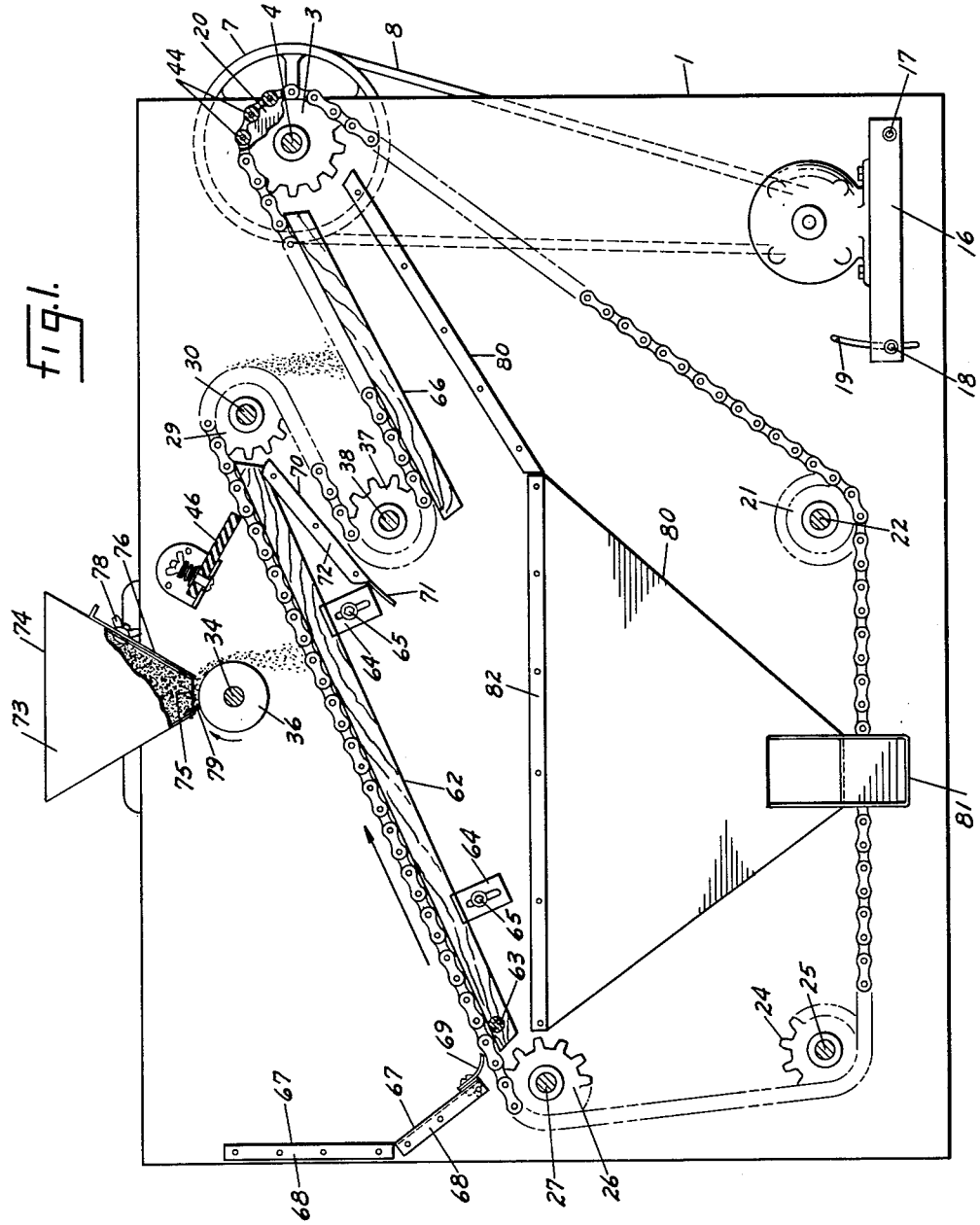
INVENTOR.
CHARLES E. BLACKMAN,
BY Parker & Carter
ATTORNEYS.

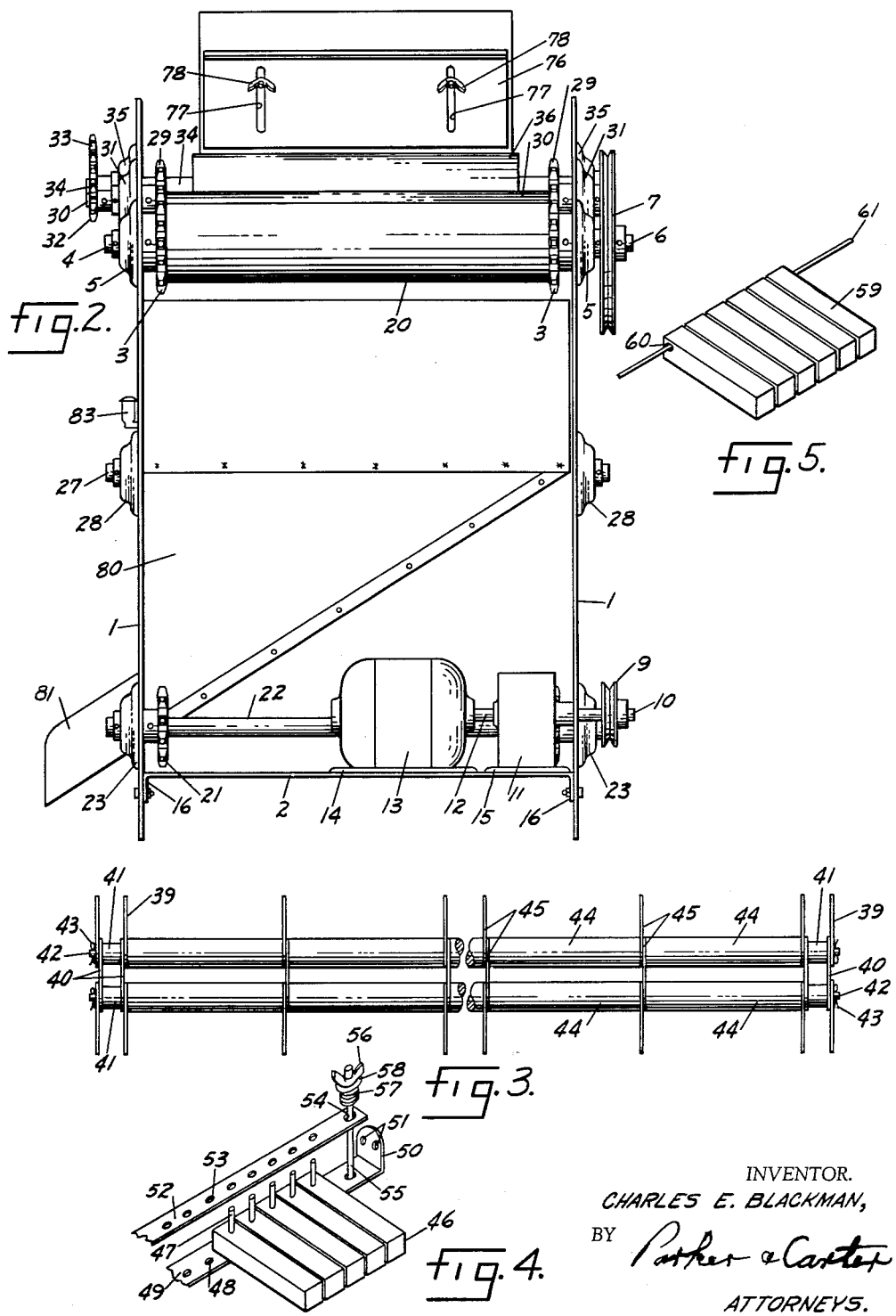

to be mounted 20 downwardly turned flanges 16, 16 which serve as side
United States Patent Office 2,974,797
Patented Mar. 14, 1961

2,974,797
GRAIN CLASSIFIER

Charles E. Blackman, Waterman, Ill., assignor to De Kalb Agricultural Association, Inc., De Kalb, Ill., a corporation of Delaware Filed Aug. 30, 1957, Ser. No. 681,205

9 Claims. (Cl. 209—307)

This invention relates to classifying methods and mechanisms. It has, for one object, to provide a method of classifying grains of various types. A specific object is to provide a method and a mechanism for classifying corn. The invention is not limited to the classification of corn or to any grain.

A further object is to provide a method and a means or mechanism for classifying corn according to shape. It is recognized that corn, as well as other grains and other articles, occurs in different shapes. Some kernels of corn, for example, are generally flat although of different sizes, and other kernels of corn are round or bulky in the sense that they are not flat. A further object of the invention is therefore to provide a method and a means of classifying corn, other grains or other materials according to thickness of the individual kernel of grain or article.

Another object is to accomplish the classification with a minimum of handling of the material being classified.

A still further object is to provide a method and means whereby the classification is carried out without rough handling and whereby damage to the particles is reduced to a minimum or is completely eliminated.

Other objects will appear from time to time in the specification and claims.

The invention is illustrated in the accompanying drawings wherein:

Figure 1 is a vertical side elevation, with parts in cross section, of one form of the device of this invention which is capable of carrying out the method of this invention;

Figure 2 is a vertical end view;

Figure 3 is a detail view on an enlarged scale of a portion of the conveyor mechanism by which the particles are classified and upon which they fall for classification;

Figure 4 is a perspective view of the finger assembly shown in Figure 1;

Figure 5 is a perspective view similar to Figure 4 showing a modified form of finger assembly.

Like parts are designated by like characters throughout.

In the particular form here shown, the mechanism which carries out the method of the invention comprises a framework and a housing capable of supporting and enclosing a conveying and classifying belt-like member and means for driving it. This belt-like member is of the general type which, in the past, when used in separating mechanisms, has been called a "raddle." This term may conveniently be used to describe this element of the device in the present connection.

In addition to the raddle, the mechanism includes a feed hopper, a feed roll or roller, a finger assembly, a discharge hopper, a driving motor or its equivalent and a connection from the motor to the assembly whereby the raddle and the rolls are driven.

As shown, the housing may be in the form of side sheet members 1, 1 which act as frame members to support the various parts of the assembly and also act as the enclosures. A plate-like member 2 serves as the bottom enclosure and as a frame member. Enclosures, not shown, and a top enclosure, not shown, serve as frame members and enclosure or housing members as well.

Positioned within the enclosure and supported upon it or upon suitable frame members are a plurality of pairs of sprockets. These include driven sprockets 3, 3 mounted upon a head shaft 4, carried in suitable bearings 5. At one end the head shaft 4 extends laterally, as shown at 6, and carries a driving pulley 7. This pulley is adapted to receive and to be driven by a belt 8 which is itself driven from a pulley 9. The pulley 9 is fixed upon a shaft 10, which is driven from a reduction gear 11. The particular details of the reduction gear form no essential part of this invention and are not shown in detail. They are contained within a suitable housing. The reduction gear 11 is driven by a shaft 12 from an electric motor 13. The motor 13 and the reduction gear 11 are provided, respectively, with bases 14 and 15. These may be mounted upon the member 2. As shown, this member includes frame portions. They may be pivoted as at 17 and held in adjusted position by bolts 18 which penetrate arcuate slots 19 formed in the side plate or frame members 1.

It is to be understood that the frame members and the housing members are shown only diagrammatically. They are shown only sufficiently to indicate that the members of the total assembly are supported on suitable supports and that the mechanism is enclosed. The particular details of the supporting frame or other supporting member and the enclosing parts form no essential part of the invention, and for that reason it appears to be unnecessary to make a detailed showing of them.

By means of this construction the motor, the reduction gear and the driving shaft 10 may be moved upwardly and downwardly to adjust the tension on the belt 8. The side plate 1 through which the shaft 10 passes is provided with a slot or with an opening of odd shape of sufficient size to permit the up and down movement required. This opening has been omitted from the showing of the drawings to simplify them.

Positioned on the head shaft 4 is a relatively soft roller 20 which may be of sponge rubber or of any material having generally similar physical properties.

Pairs of spaced idler sprockets are provided in the system and are supported on the general supporting frame. These include idler sprockets 21, 21 carried on the shaft 22 which is supported in suitable bearings 23, 23. Sprockets 24 are carried upon a shaft 25 which is carried in take-up bearings, not shown. Shafts 22 and 25 are generally on the same level as are their respective bearings.

A third pair of idler sprockets is indicated at 26, 26. They are carried upon a shaft 27 supported in suitable bearings 28. The uppermost idler sprockets 29, 29 are carried on a shaft 30 which is itself supported in suitable bearings 31, 31. At one end the shaft 30 has fixed upon it another sprocket 32. Sprocket 32 has a conventional sprocket chain (not shown) driving connection with a sprocket 33 fixed to the shaft 34 which is carried in bearings 35. Fixed upon the shaft 34 is a feed roller 36 which is preferably of rubber or other relatively soft material which can be advantageously used in the present situation because of its cushioning effect.

A final pair of idler sprockets 37, 37 is carried upon a shaft 38. The shaft 38 is supported in suitable bearings, not here shown in detail, but conforming generally to the type of bearings shown in connection with the other sprocket-carrying shafts.

Positioned about and in engagement with the several sprockets are two chains forming part of the raddle assembly. These chains may be of conventional design and include pairs of outer links 39 and pairs of inner links 40. Spacing rollers 41 are mounted at each end of each pair of inner links and between them. Elongated pins or rods 42 extend from side to side of the raddle assembly. Thus these pin or rod members 42 serve as the pintle pins on the chains and also serve to carry the additional parts which will be described below. The pins or rods 42 may be held in assembled position in the chain and in the assembly generally by cotters 43 or otherwise.

The raddle includes the two side chains as described above and the plurality of roller members 44 positioned on the pins or rods 42. The raddle may be of any desired width. Cant strips may overlie chains 39 and 40.

The length of the rollers 44 will be whatever is desired and between each pair of rollers 44 there are positioned chain lengths 45 comparable to and preferably identical with the inner and outer chain links 39 and 40, which are described above. The purpose of the chain links 45 is to act as positioning parts to control the spacing of the rollers 44 throughout the width of the raddle. The spacing between consecutive adjacent rollers 44, and therefore the size or thickness of the particles passed by the raddle may be adjusted by simply varying the outside diameter of rollers 44. The chain link members 45 will be positioned across the raddle assembly at sufficiently short intervals to insure accurate positioning and spacing of the rollers from side to side of the raddle assembly. Although the invention is not limited to these particular details, it is preferable to include in the raddle assembly standard chain links 39, 40 and 45, and to use between the inner chain links 40 a standard roller member 41.

As best seen in Figure 1, the continuous or endless raddle thus formed is arranged about the sprockets described to define a first or upper classifying run upwardly inclined in the direction of its travel, a first or partial return run, a second or lower classifying run similarly inclined, and a second or final return run.

As shown generally in Figure 1 and in detail in Figures 4 and 5, assemlies of fingers are mounted across the raddle and arranged to extend as a whole over the full effective working width of the raddle. As shown in Figures 1 and 4, the fingers which are preferably flexible and which may be made of rubber are individually movable. In the form shown in Figures 1 and 4, the rubber or rubber-like fingers 46 are mounted upon pins 47. The pins 47 may be in the form of bolts or screws which pass through openings 48 in a positioning bar 49. The bar is provided at each end with a flange 50 bent at right angles to the member 49. The flanges 50 are provided with perforation 51 by means of which they may be secured to the side frame members or to the housing if desired.

A transverse bar 52 is provided with perforations or other openings 53. Through these the bolts or screws 47 extend as shown in Figure 1. At each end the bar 52 is perforated or slotted as at 54 to receive at one end an adjusting screw 55. This screw passes through a suitable opening in the member 49 and receives upon its upper end an adjusting or thumb nut 56. About the adjusting screw 55 is a spring 57. To the top of the spring 57 the adjusting thumb nut 56 is mounted in a washer 58.

By the adjustment of the thumb nut 56 at each end of the bar 52 pressure may be exerted upon the ends of the fingers 46 through which pass the bolts or screws 47. The effect of the form of finger assembly as shown in Figures 1 and 4, is to provide a series of flexible individually displaceable rubber-like fingers extending across the width of the raddle. They are so positioned as to contact the raddle, bearing yieldingly upon the upper surface thereof.

In the modified form of Figure 5 the rubber or rubber-like fingers of the finger assembly comprise members 59 which are perforated as at 60 and received loosely upon a rod 61. The rod extends from side to side of the assembly. The rubber fingers are not under load and rest upon the raddle by gravity alone. They may move individually. Either form of the finger assembly may be used.

In order to maintain the raddle assembly in proper position it is convenient along the two upper runs of the chain to provide guides. Thus on the uppermost run, that which first receives the grain or other material to be classified are provided chain guides or slides 62. An oil impregnated wick 63 is fixed in each of the slides 62 to provide lubrication for the driving chain which passes therealong.

Each guide 62 may include one or more slotted stirrups 64. The stirrups 64 engage adjusting screws or bolts 65. By this means slide or guide member 62 may be raised or lowered to maintain the upper run of the chain in proper position and to cause it to move along the proper path and in the proper direction.

A second pair of chain guides or slides 66 is shown in Figure 1. They bear upon the shorter upper run and serve also to maintain that run of the raddle in proper position and to insure the movement of the raddle at that point along the proper path. It is convenient to make the chain guides or slides of hard wood but they may be made of other material. Their main purpose is to prevent the raddle from sagging and to compel it to move always along its predetermined path.

A guard sheet 67 is provided with flanges 68, 68 which are secured to the side frame members or to the enclosures. A flexible wiper member 69 may be secured to the lower end of the guard sheet 67. The sheet 67 and the wiper 69 prevent displacement or movement of the grain downwardly in the direction opposite to the movement of the upper raddle runs as indicated by the arrow of Figure 1.

Beneath the upper run of the raddle and above the first return run is positioned a second guard sheet 70 which is provided with a downwardly curved portion 71 and side flanges 72 which may be secured to the housing or support frame. This guard sheet 70 overlies the shaft 38 and the sprockets 37 upon it.

Positioned above the upper run of the raddle and above the feed roller 36 is a feed hopper 73. As shown, it has an open top 74 and an open bottom 75 of reduced area as compared to the open top. A feed roller 36 which has been previously mentioned, is positioned beneath the opening bottom 75 of the feed hopper. An adjustable valve member 76 is positioned adjacent the open bottom 75 of the feed hopper and is slotted as at 77, 77. Adjusting nuts 78, 78 are provided. They pass through the slot 77 and engage a fixed portion of the feed hopper. By means of the adjusting nuts and the slots the valve member 76 may be moved to and fixed in adjusted position to control the discharge opening from the hopper. A preferably flexible wiper member 79 is provided adjacent the bottom of the hopper and engages the surface of the feed roll 36. Thus grain or other material for classification pass over the feed roller 36 in one direction only. The direction of rotation of the feed roller is shown by the curved arrow in Figure 1 and the falling grain is indicated in that figure.

A discharge hopper is positioned below the upper and lower classifying runs of the raddle and comprises receiving sheets or members 80 and a discharge spout 81. The receiving hopper may be of any desired shape. Generally it will extend from side to side of the raddle and from end to end of the zone from which material will pass through the raddle. It thus underlies substantially the full length of the upper and lower classifying runs of the raddle. The sheet members 80 may include flanges 82 by means of which they are secured to the frame members or to the housing members of the assembly.

While the lubricating wick 63 above mentioned may be of any desired construction and while lubrication for the driving chain may be supplied in any desired manner, the oil impregnated wicks 63 are satisfactory and if they are used an oil reservoir 83 is provided.

The use and operation of this device are as follows:

The driving motor is connected with a source of electrical power and when the mechanism is to be used and the method of the invention is to be carried out the motor is energized. It thus drives the driving belt and actuates the head shaft. And through the drying sprockets fixed to the head shaft it drives the driving chains of the raddle. There is no critical raddle speed, the same being set in accordance with the volume of material introduced. The direction of movement of the raddle is indicated by the straight arrow in Figure 1. The raddle thus moves upwardly and to the right as shown in that figure. It moves continuously beneath the feed hopper and beneath the feed roller, which is itself positioned beneath the hopper. Grain or other material to be classified falls through the clearance above the feed roller which is itself a cushioning member. The feed roller which is driven with the shaft 34 carries the grain or other material in the direction shown in Figure 1 and discharges it upon the raddle. Material so discharged reaches the raddle readily after having passed over the cushioned surfacing of the feed roller and falls a relatively short distance upon the raddle.

The raddle comprises, as shown in Figure 3 in particular, a plurality of members accurately spaced and thus defining accurately spaced openings between the adjacent pairs of rollers throughout the length and width of the raddle. The rollers 44 are made accurately to size of any suitable material and are held accurately spaced by the chain links 39, 40 and 45. The intervals or spaces between adjacent members 44 are thus accurately fixed to predetermined dimensions and are maintained in accurate dimension at all times. Grain or other articles of suitable size will pass through the spaces between the members 44. Sometimes a particle which in one dimension is flat enough or thin enough to pass through the raddle, will fail to do so at first because it may lie across an opening between adjacent members 44. The springs fingers 46 being of rubber or rubberlike material, will move the articles so straddling the opening with a minimum of contact or a minimum of grinding or crushing effect. In whichever form the rubber finger assembly is used, each finger is individually yieldable, being formed of rubber-like material, and each finger is itself of yieldable soft cushioning material. The fingers are in neither form held strongly against the upper surface of the raddle. They merely ride against it, and as grain or other articles come in contact with the fingers 46 it, that is to say the grain or any other article undergoing classification, is turned gently, and if it is of such shape and dimension that it can pass through the raddle but has not yet done so because of its position upon the raddle, the effect of the fingers 46 is to move it to present all dimensions of the particle to the raddle so that it will pass through. Grains or other articles which are definitely not of such size or shape that they can pass through the raddle will emerge from under the fingers 46 and will be discharged over the end of the upper or first classifying run of the raddle and will fall upon the second or lower classifying run of the raddle.

This is shown diagrammatically in Figure 1. With those particles which are definitely oversized, some particles of suitable size and shape which, by accident, have not yet passed through the raddle will emerge from under the fingers 46 and ride the raddle through the nose-over produced by sprockets 29 and will fall upon the second classifying run of the raddle, thus being reintroduced to the classifying operation. They are thus given a further opportunity to fall through the raddle. All the grain or other articles undergoing classification which pass through the raddle will be received into the discharge hopper and will emerge from the spout 81.

The articles which are definitely oversize and cannot pass through the raddle are discharged out of the machine to the right, as shown in Figure 1. They will be caught in a suitable receiving hopper or other device. No such hopper is shown as such details form no essential part of the invention.

The cushion rubber roll 20 which is received upon the head shaft 4 extends throughout the width of the raddle. It is of such diameter that it contacts each of the rolls or rollers 44 as they pass over it. It is preferably of such diameter that it is compressed slightly by the members 44 and thus projects somewhat into the space between each adjacent pair of members 44. It may, for example be equal in diameter to the pitch diameter of the sprockets 3. Should any grain or other article have become jammed or caught in the raddle, this contact of the members 44 with the roll 20 will dislodge them and will make sure that no articles are retained in the raddle to be carried downwardly. The roll 20 thus serves as a means for ejecting any articles which would otherwise still be retained in the raddle or on the raddle as it passes over the head shaft 4.

I claim:

1. In a classifier, a support, a feed member positioned to deliver material to be classified, a receiver positioned to receive classified material, an endless raddle positioned for movement between said feed member and said receiver, said raddle comprising an endless chain having longitudinally spaced, laterally disposed members, the spacing between said members constituting the sizing element of said raddle, said raddle including a first classifying run extending across substantially the entire extent of said receiver, a first limited return run, a second classifying run extending through the remainder of the distance across said receiver beneath said first classifying run and extending outwardly past the edge of the receiver, and a final return run extending to the beginning of the first classifying run, said first classifying run being positioned to deliver any material remaining upon said raddle at the end of said first classifying run to said second classifying run.

2. A grain classifier comprising a support, an endless chain movable on said support and including a first and a second classifying run, said first and second runs lying in separate planes extending generally in the same direction, said second run extending underneath said first run, a feed hopper positioned above said classifying runs, a receiving hopper positioned beneath said classifying runs, said chain comprising a pair of laterally spaced link chains, the links of said chains being pivotally mounted at the opposite ends of a single set of elongated pintles, a roller member rotatably mounted on and enclosing each of said pintles between said link chains, a support for a classifying run including a pair of laterally spaced, generally elongated, rectilinear members positioned beneath and supporting the link chain portions of said chain, said support having a limited movement transverse to the direction of travel of the chain to thereby permit adjustment of the angle and height of the chain, and lubricating wicks carried by the support and positioned to deliver lubricant to the links of each chain and the elongated chain support at a point adjacent the initial contact of said link chains with said support.

3. In a classifier for grain and the like, a support, an endless raddle movably mounted on said support, said raddle having a first and a second classifying run, said first and second runs lying in separate planes extending generally in the same direction, said second run extending underneath said first run, a feed hopper positioned to deliver material to be classified to the upper surface of a classifying run, a member positioned beneath the classifying runs for receiving classified material passing through said raddle, said raddle comprising an endless chain, said chain comprising a pair of laterally spaced parallel link chains having a common set of elongated pintles, roller members positioned on said pintles between said spaced link chains, said raddle being supported on said support along the longitudinal side edges of said raddle only, and a substantially continuous curtain comprising separate and individually movable finger members positioned transversely and adjacent the distal end of one of said classifying run having finger elements yieldingly urged against said raddle to engage material thereon.

4. A classifying apparatus comprising a feed hopper, a receiving bin, support means for the hopper and bin, discharge means for the hopper and bin, a raddle supported between the hopper and bin, said raddle having a first classifying run upwardly inclined along the direction of travel, said first classifying run being positioned between the feed hopper and the receiving bin, elongated support means for the first classifying run adjustably connected to the support structure to thereby eliminate sag along the run, a first return run located between the first classifying run and the receiving bin, a deflector member interposed between that portion of the first classifying run overlying the first return run to thereby prevent impingement of material discharged through the first classifying run on to the return run, a second classifying run between the first return run and the receiving bin and positioned to receive material remaining on the first classifying run at its terminal end, a second return run extending between the end of the second classifying run and the beginning of the first classifying run, and repositioning and alignment means comprising a plurality of flexible finger-like elements extending across the distal end of the first classifying run to form a substantially continuous wall, said elements extending into contact with the first classifying run and operative to facilitate discharge of material carried thereon through the raddle, said finger-like elements being insufficient to prevent movement of material therepast.

5. In a classifier, a support, an endless raddle movable in said support, said raddle comprising an endless chain of longitudinally spaced roller members, the spaces between each longitudinally adjacent consecutive pair of rollers defining classifying spaces, said raddle having a first classifying run upwardly inclined in the direction of its travel whereby the friction forces tending to move the material the length of the first classifying run are counteracted by gravity, a feed member positioned to deliver material to be classified to said first classifying run, and a receiver member positioned to receive material from said raddle beneath said first classifying run, said raddle including a second classifying run positioned to underlie the distal end of said first classifying run and being upwardly inclined along a path substantially parallel with and spaced below said first mentioned classifying run.

6. In a classifier, a support, an endless raddle moveably mounted on said support, a feed member positioned to deliver material to be classified to said raddle, a receiver positioned to receive classified material from said raddle, said raddle having a first classifying run moveable in a path between said feed member and said receiver and extending across substantially the entire extent of said receiver, a first return run moveable in a path between the feed member and the receiver, a second classifying run moveable in a path between the feed member and the receiver and spanning at least the remaining distance across the receiver, a second return run between the end of the second classifying run and beginning of the first classifying run, said raddle between said second classifying and second return runs being entrained over a roller formed of compressible material whereby the material of said roller is forced into the open spaces of said raddle to dislodge any material remaining therein prior to the beginning of the second return run.

7. In a classifier for grain, a support, an endless raddle moveable on said support and including a first and second classifying run, said first and second runs lying in separate planes extending generally in the same direction, said second run extending underneath said first run, a feed member positioned to deliver material to be classified to a classifying run, a receiver positioned to receive classified material passing through said raddle from said classifying runs, a substantially continuous curtain comprising separate and individually moveable fingers transversely positioned adjacent to the distal end of one of said classifying runs and having a portion yieldably urged into engagement with said raddle.

8. The structure of claim 6 including clamp means securing said finger members such that they are pressure urged against said raddle at a pressure sufficient to ensure engagement with material on said raddle but insufficient to form a dam for said material.

9. The structure of claim 6 wherein said finger elements are loosely mounted on said support such that they are urged against said raddle by the action of gravity.

References Cited in the file of this patent

UNITED STATES PATENTS

| | | |
|---|---|---|
| 556,786 | Thompson | Mar. 24, 1896 |
| 1,636,227 | Grabill | July 19, 1927 |
| 1,715,197 | Grabill | May 28, 1929 |
| 1,947,035 | Covington | Feb. 13, 1934 |
| 2,139,380 | Norris | Dec. 6, 1938 |
| 2,153,688 | Fitzgerald | Apr. 11, 1939 |
| 2,406,842 | Lupton | Sept. 3, 1946 |
| 2,449,611 | Lupton | Sept. 21, 1948 |
| 2,813,599 | Amberg | Nov. 19, 1957 |